United States Patent [19]

Matsuo et al.

[11] 4,073,775
[45] Feb. 14, 1978

[54] POWDER COATING COMPOSITION

[75] Inventors: Shunji Matsuo; Kiichiro Sasaguri; Katsuyuki Nakamura, all of Fuji; Yoshio Matsumoto, Nobeoka; Mikio Sato, Fuji, all of Japan

[73] Assignee: Asahi Kasei Kogyo Kabushiki Kaisha, Osaka, Japan

[21] Appl. No.: 693,913

[22] Filed: June 8, 1976

[30] Foreign Application Priority Data

June 12, 1975 Japan .................................. 50-70178

[51] Int. Cl.$^2$ ...................... C08G 51/84; C08G 45/04; C08G 45/00; C08F 24/00
[52] U.S. Cl. .......................... 260/47 EP; 260/47 EC; 260/47 EA; 260/47 EN; 260/47 UA; 260/836; 526/16; 526/54; 526/273
[58] Field of Search ........ 260/47 EP, 47 EC, 47 EA, 260/47 EN, 47 UA, 836; 526/16, 54, 273

[56] References Cited

U.S. PATENT DOCUMENTS

| 2,934,521 | 4/1960 | Masters ............................. 260/47 EC |
| 2,935,488 | 5/1960 | Phillips ............................. 260/47 EC |
| 2,947,717 | 8/1960 | Belanger et al. ................. 260/47 EC |
| 3,509,230 | 4/1970 | Clarke ............................. 260/47 EC |
| 3,752,870 | 8/1973 | Labana ............................. 260/836 |
| 3,753,917 | 8/1973 | Spoelder ......................... 260/47 EN |
| 3,758,634 | 9/1973 | Labana et al. .................. 260/836 |
| 3,781,380 | 12/1973 | Labana et al. .................. 260/836 |
| 3,787,520 | 1/1974 | Labana et al. .................. 260/836 |

OTHER PUBLICATIONS

"Advances in Chemistry" Series 125, Narajima pp. 98-107, ACS Washington, D. C. 1973, Myer Erzin Editor.

*Primary Examiner*—Herbert J. Lilling
*Attorney, Agent, or Firm*—Armstrong, Nikaido & Marmelstein

[57] ABSTRACT

A thermosetting powder coating composition having good handling characteristics and capable of being baked under relatively mild conditions and providing a coating having practically satisfactory properties. This coating composition is prepared by incorporating in 100 parts by weight of an epoxy group-containing acrylic or methacrylic copolymer having a glass transition point of 30 to 90° C. and a weight average molecular weight of 2,500 to 30,000, said copolymer consisting of 3 to 35% by weight of acrylate or methacrylate monomer units and 97 to 65% by weight of ethylenically unsaturated monomer units, 3 to 40 parts by weight of a specific diphenol having at its both terminals hydroxybenzoic acid ester structures as represented by the general formula:

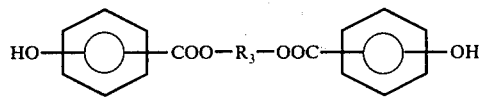

wherein $R_3$ stands for a hydrocarbon radical having 2 to 20 carbon atoms or a linking group containing, at least at its both terminals, hydrocarbon radicals and in its main chain at least one member selected from the group consisting of an ether linkage, ester linkage, urethane linkage and amide linkage, and having totally 4 to 20 carbon atoms. Especially good results are obtained when a specific phenol compound containing in the molecule one phenolic hydroxyl group and either one carboxyl group or one hydroxyl group, or a specific benzoic acid compound containing in the molecule two carboxylic acid groups are further incorporated in this powder coating composition.

10 Claims, No Drawings

POWDER COATING COMPOSITION

This invention relates to a thermosetting acrylic powder coating composition which has good handling characteristics and can be baked under relatively mild conditions to provide a coating having a well-balanced combination of practical physical properties and other practical properties such as appearance.

In the art of synthetic resin paints, powder resin paints free of volatile components such as solvents and water have recently been developed as pollution-free, energy-saving, resource-saving and labor-saving paints.

Epoxy resin powder paints have heretofore been practically used as such powder paints most generally. Because of poor weatherability, however, their application fields are limited. Thermosetting acrylic powder paints comprising an epoxy group-containing acrylic resin have now been developed in the art as powder paints overcoming the above defect.

Indeed, it is expected that these thermosetting acrylic powder paints show excellent weatherability, good gloss, good flow characteristics and are excellent in other practical properties because of inherent characteristics of acrylic resins. However, it is very difficult to attain in these powder paints a well-balanced combination of handling characteristics, practical physical properties of the resulting coatings and other properties of the resulting coatings such as appearance. Accordingly, they have not been practically used on an industrial scale. Another defect of the conventional acrylic powder paints is that a relatively high temperature and a long time are required for baking. Such defect not only limits the application fields and the kinds of articles to be coated but also is in conflict with the object of powder paints, that is, saving of energy. Further, the high-temperature baking tends to cause considerable generation of volatile components, and discoloration of the resulting coating.

For example, powder paints comprising a glycidyl group-containing acrylic resin and a polybasic carboxylic acid (see U.S. Pat. No. 3,752,870) pollute the environment by generation of large quantities of gases composed mainly of the polybasic carboxylic acid at the baking step. Still further, when these powder paints are used, it is very difficult to obtain coatings having practically satisfactory physical properties and good appearance in combination.

Further, there are known powder paints comprising a glycidyl group-containing acrylic resin and a carboxyl group-containing resin (see U.S. Pat. No. 3,781,380). In these resins, however, a compatibility between the two resin components is very poor, and it is very difficult to obtain practically applicable coatings having good gloss.

Still further, in known powder paints comprising a glycidyl group-containing resin and a diphenolic acid (see Japanese Patent Application Laid-Open Specification No. 50046/74), coagulation of paint particles is readily caused in these powder paints during storage. Therefore, these powder paints are insufficient in handling characteristics.

Still in addition, there are known powder paints comprising a methylglycidyl group-containing acrylic resin and hydroxy-benzoic acid (see French Pat. No. 2,200,302). When ortho-hydroxybenzoic acid is used, yellowing and volatillization of ortho-hydroxybenzoic acid are conspicuous at the baking step. When meta- or para-hydroxybenzoic acid is employed, it is impossible to disperse the hydroxybenzoic acid uniformly in the acrylic resin by melt-kneading both the components under such temperature conditions as will not cause substantial reaction between epoxy groups in the acrylic resin and the hydroxybenzoic acid. Further, it is impossible to obtain coatings excellent in appearance from these powder paints. Moreover, since the hydroxybenzoic acid used as the cross-linking component has a rigid molecular structure, the resulting coatings lack the flexibility and hence, physical properties of the resulting coatings are low.

Furthermore, there are known powder paints comprising a glycidyl group-containing acrylic resin and a diphenol compound or a phenolic hydroxyl group-containing resin (see U.S. Pat. No. 3,758,634 and U.S. Pat. No. 3,787,520). When these powder paints are employed, in order to obtain coatings having practically satisfactory physical properties, a high temperature and a long time are required at the baking step. Accordingly, the object of saving an energy cannot be attained in these powder paints. Moreover, extreme yellowing is caused in the coating at the baking step. In short, because of these various defects, thermosetting acrylic powder paints containing a diphenol compound as a curing agent can hardly be put into practical use.

As a result of our extensive and intensive investigations with a view to developing powder coating compositions including an epoxy group-containing acrylic polymer and as a curing agent a diphenol which compositions not only has good handling characteristics and can be baked at a relatively low temperature but also is capable of providing a coating film having practically satisfactory properties, it has been found that the use of a curing agent of a diphenal compound having a specific structure provides a powder coating composition having desired excellent properties. The present invention has been made based on such novel finding.

More specifically, in accordance with this invention, there is provided a powder coating composition which comprises (A) 100 parts by weight of a copolymer having (1) 3 to 35% by weight, based on said copolymer, of a monomer unit represented by the following general formula

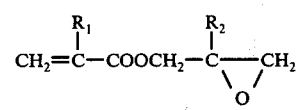

wherein $R_1$ and $R_2$ stand for a hydrogen atom or a methyl group, and (2) from 97 to 65% by weight of ethylenically unsaturated monomer unit other than said monomer unit, said copolymer having a glass transition point of 30° to 90° C. and a weight average molecular weight of 2,500 to 30,000, and (B) 3 to 40 parts by weight of at least one of compounds represented by the general formula

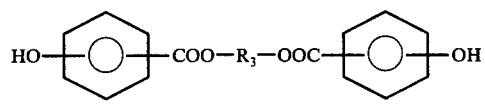

wherein $R_3$ stands for hydrocarbon radical having 2 to 20 carbon atoms or a linking group containing, at least at its both terminals, hydrocarbon radicals and in its main chain at least one member selected from the group consisting of an ether linkage, ester linkage, urethane linkage and amide linkage, and having totally 4 to 20 carbon atoms. The component (B) acting as a diphenol type curing agent for the acrylic polymer component (A) is a specific diphenol having at its both terminals hydroxybenzoic acid ester structures.

Namely the component (B) in the powder coating composition of this invention has in the molecule at least two ester linkages. Accordingly, it has a good compatibility with the copolymer component (A). Further, it has a suitable melting point. Therefore, while a powder paint is prepared by melt-kneading both the components (A) and (B), no cross-linking reaction is caused to occur between the epoxy group of the copolymer (A) and the component (B) can easily be dispersed uniformly and completely in the copolymer component (A). By virtue of these characteristics, the composition of this invention can provide a coating excellent in appearance by coating and baking.

Further, when the component (B) is used according to the present invention, as a curing agent for an epoxy-containing acrylic polymer, there can be attained such an extremely advantageous effect that the baking temperature of the powder coating composition can be remarkably lowered as unexpected from the use of conventional diphenol type curing agent.

Furthermore, since the component (B) which acts as a cross linking molecule for the copolymer component (A) contains soft linked segments between the two phenolic hydroxyl groups, the composition of this invention gives a good flexibility to the resulting coating after the baking treatment. That is, they give a coating sufficient in toughness and excellent in such mechanical strengths as shown by Erichen value and DuPont Impact-Value.

In addition to the foregoing characteristics, the powder coating composition of this invention has excellent properties. For example, the composition has no tendency for the paint particles to coagulate even under high temperature and high humidity storage conditions. Since the component (B) has a relatively high molecular weight and it is uniformly dispersed in the copolymer component (A), the amount of a harmful gas generated at the baking step can be much reduced. Thus, the powder coating composition of this invention has very excellent characteristics.

As mentioned above, the powder coating composition of this invention has good handling characteristics, can be baked under relatively mild conditions and provides a coating having a well-balanced combination of practical physical properties and other practical properties such as appearance.

The components (A) and (B) constituting the powder coating composition of this invention will now be described in detail.

As pointed out hereinabove, the copolymer component (A) of the powder coating composition of this invention is one obtained by copolymerizing (1) from 3 to 35% by weight of a monomer represented by the following general formula

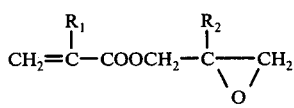

wherein $R_1$ and $R_2$ each stand for a hydrogen atom or a methyl group, with (2) from 97 to 65% by weight of ethylenically unsaturated monomers other than said monomer.

As the monomer represented by the above general formula there can be mentioned, for example, glycidyl acrylate, glycidyl methacrylate, β-methylglycidyl acrylate and β-methylglycidyl methacrylate.

The amount of the monomer unit contained in the copolymer (A) represented by the above general formula is 3 to 35% by weight, preferably 10 to 25% by weight, based on the total copolymer (A). When the amount of this monomer unit is less than 3% by weight, no sufficient cross-linking can be attained and the resulting coating is insufficient in the physical properties and the solvent resistance. If the amount of the above monomer exceeds 35% by weight, in many cases a good appearance is not attained in the resulting coating, and sufficient elongation and toughness cannot be obtained.

As the ethylenically unsaturated monomer to be used as the other monomer of the copolymer (A), which is copolymerizable with the above monomer, there can be mentioned, for example, acrylic acid esters such as methyl acrylate, ethyl acrylate, n-butyl acrylate, isobutyl acrylate, 2-hydroxyethyl acrylate and 2-ethylhexyl acrylate, methacrylic acid esters such as methyl methacrylate, ethyl methacrylate, n-butyl methacrylate, isobutyl methacrylate, 2-ethylhexyl methacrylate, 2-hydroxyethyl methacrylate lauryl methacrylate and tridecyl methacrylate, and methacrylonitrile, acrylonitrile and the like.

Other ethylenically unsaturated monomers, for example, alkenyl aromatic monomers such as styrene, vinyltoluene and α-methylstyrene, are able to be used with above-mentioned acrylic monomers.

The weight average molecular weight of the copolymer (A) is 2,500 to 30,000, preferably 6,000 to 25,000, and the glass transition temperature is 30° to 90° C., preferably 40° to 75° C., most preferably 40° to 70° C.

In case the weight average molecular weight or the glass transition point is higher outside the above-mentioned range, at the baking step, the cross linking reaction proceeds before the powder paint is completely molten and form a smooth coating film. For this reason, the good appearance of the resulting coating does not attained in this case.

In case the weight average molecular weight or the glass transition point is lower the above-mentioned range, a powder paint having excellent properties and handling characteristics as intended in this invention cannot be obtained.

The copolymer (A) can be prepared by various known copolymerization methods.

The compound (B) to be used as the component in the powder coating composition of this invention will now be described in detail. The component (B) serves as a curing agent for the acrylic polymer component (A) and is a compound represented by the following general formula

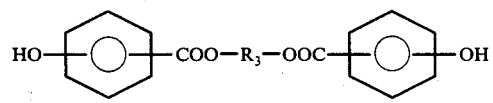

wherein $R_3$ stands for a hydrocarbon radical having 2 ro 20 carbon atoms or a linking group containing, at least at its both terminals, hydrocarbon radicals and in its main chain at least one member selected from the group consisting of an ether linkage, ester linkage, urethane linkage and amide linkage, and having totally 4 to 20 carbon atoms. Such component (B) of the above general formula may be employed singly or in mixture.

The component (B) is a specific diphenol compound having at its both terminals hydroxybenzoic acid ester structures linked with each other through the linking group $R_3$. Due to such specific overall structure, the component (B) can provide an excellent effect as a curing agent in comparison with the conventional diphnols such as bisphenol A. The linking group $R_3$ is a linking chain capable of linking the terminal hydroxybenzoic acid residues. As such linking group $R_3$, there can be mentioned a straight chain linking group, a linking group having side chains and a linking group having in its main chain hetero atoms such as ether linkage, ester linkage, urethane linkage or amide. However, said component (B) has preferably only two terminal phenols as reactant groups for the component (A), and therefore, it is not preferable to employ a linking group having in its side chain such a functional group, for example, an amino group or a carboxyl group as will react with an epoxy group in the component (A) under baking conditions of the powder coating composition in this invention because the presence of such functional group prevents the reaction between phenol groups in the component (B) of this invention and the epoxy group in the component (A) during the curing reaction. In case the linking group $R_3$ stands for a hydrocarbon radical, the number of carbon atoms should be in the range of 2 to 20 and in case the linking group $R_3$ is a linking group containing in its main chain ester linkage, ether linkage, urethane linkage or amide linkage, it should be within the range of 4 to 20. In case the group $R_3$ has more than 20 carbon atoms, the excellent properties of the resulting coating due to the inherent characteristics of the acrylic polymer component (A) is decreased. Further, when the above-mentioned linking group containing in its main chain an ester linkage, ether linkage, urethane linkage or amide linkage has less than 4 carbon atoms, the compound containing such linking group is not in practical use because such compound is difficult to synthesize at a low cost.

The component (B) is a diester derived from a hydroxybenzoic acid and a diol and include a wide variety of compounds. As the hydroxybenzoic acid, there may be employed an ortho-, meta-or para-hydroxybenzoic acid or derivatives of such hydroxybenzoic acids in which the hydrogen atom of the benzene ring is substituted with an alkyl group or a halogen atom. Any of the compound produced from such various kinds of hydroxybenzoic acids or derivatives shows an excellent effect as a curing agent in the powder coating compositions of this invention, but when there are taken into consideration the mechanical strength of resulting coatings and the ready availability of hydroxybenzoic acids or their derivatives to be used to react with diols, the ortho-, meta- and para-hydroxybenzoic acids may be preferably employed, and para-hydroxybenzoic acid is most preferred.

Another element constituting the component (B) is a diol represented by the general formula $$HO - R_3 - OH \quad (I)$$

wherein $R_3$ is the same as mentioned above.

One class of diol of the above formula (I) is a diol represented by the general formula $$HO - R_4 - OH \quad (II)$$

wherein $R_4$ stands for a hydrocarbon radical having 2 to 20 carbon atoms. As the diol of this class, there can be mentioned a straight chain diol represented by the general formula $$HO \text{-}(CH_2)_m\text{-} OH$$

wherein $m$ is an intenger of 2 to 20, such as ethylene glycol, 1,3-propane diol, 1,4-butane diol, 1,6-hexane diol, 1,10-decane diol and the like. As the diol of the general formula (II), there can further be mentioned a diol compound having in its side chain a substituent, for example, 1,2-propane diol, neopentyl glycol, 2,2'-di(chloromethyl) 1,3-propane diol and the like. As the diol represented by the general formula (II), there can still further be mentioned a diol having a cyclohexane ring structure, for example, 1,4-cyclohexane diol, 1,4-cyclohexane dimethanol, hydrogenated bisphenol A, and the like. In addition, in a diol represented by the general formula (II), there can be included a diol having benzene ring structure, for example, xylylene glycol and the like.

Another class of diol of the aforementioned general formula (I) is a diol having in the main chain of $R_3$ hetero atoms due to ether linkage, ester linkage, urethane linkage or amide linkage.

As an example of a diol compound having an ether linkage, there can be mentioned a compound represented by the general formula $$H\text{-}(O\text{—}R_5)_s\text{OH}$$

wherein $R_5$ stands for a hydrocarbon radical having 2 or more carbon atoms and $s$ stands for for an integer of 2 or more, provided that the total number of carbon atoms in the diol should not be more than 20. As specific exampls, poly(oxyalkylene)glycols, ethylene glycol, propylene glycol and butane diol can be mentioned.

As the ester linkage-containing diol compound represented by the formula (I), there can be mentioned a compound represented by the general formula $$HO\text{—}R_6\text{—}OC(CH_2)_t\text{—}OH$$
$$\quad\quad\quad\ \ \ \|$$
$$\quad\quad\quad\ \ \ O$$

wherein $R_6$ stands for a hydrocarbon radical having 2 or more carbon atoms and $t$ stands for an integer of 1 or more, provided that the total number of carbon atoms in the diol should not be more than 20. These compounds are ester derived from a diol represented by the formula of HO—$R_6$—OH and a hydroxycarboxylic acid. As specific examples of diols of having the formula HO—$R_6$—OH, there can be mentioned ethylene glycol, propylene glycol butane diol and poly(oxyalkylene)-glycols and the like. As specific examples of hydroxycarboxylic acids, there can be mentioned glycolic acid, hydroxyacrylic acid and ε-hydroxycaproic acid. These diol compounds can be obtained by the esterification reaction between a hydroxycarboxylic acid and a glycol or the reaction between a glycol and a lactone such as β-propiolactone, ε-caprolactone, pivalolactone or the like. As specific examples of such diol compounds, there can be mentioned compounds of the following general formula

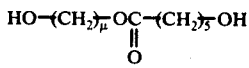

wherein u is an integer of 2 to 4.

As the kinds of ester linkage-containing diol compounds represented by the formula (I), there can be mentioned diol compounds derived from a dicarboxylic acid and a diol. As examples of the dicarboxylic acids, there can be mentioned oxalic acid, malonic acid, succinic acid, adipic acid, sebacic acid and benzene dicarboxylic acid. As examples of the diols, there can be mentioned ethylene glycol, butane diol, hexane diol, poly(oxyalkylene)-glycol and the like. As such kinds of ester linkage-containing diol compounds, there may be employed a mixture of esters containing terminal hydroxyl groups and having different degrees of polymerization, provided that the total carbon number in the molecule is 20 or less in average.

In the compounds represented by the formula (I), as a compound having urethane linkages, there can be mentioned urethane having hydroxyl groups at its both terminals. Such urethane compounds can be prepared by the reaction between a diisocyanate and an excess diol. As the diol, there may be employed, for example, ethylene glycol, propylene glycol, butane diol, hexamethylene glycol, poly(oxyalkylene)glycol or the like. As the diisocyanate, there may be employed, for example, tetramethylene diisocyanate, hexamethylene diisocyanate, 4,4'-diphenylmethane diisocyanate, tolylene diisocyanate, xylylene diisocyanate or the like.

In the compounds represented by the formula (I), the compounds having amide linkages can be synthesized from an amino alcohol such as 2-amino ethanol, 4-amino butanol or the like and a dicarboxylic acid such as oxalic acid, malonic acid, succinic acid, adipic acid, sebacic acid, dodecandicarboxylic acid, benzene dicarboxylic acid or the like or its derivatives.

As the other compounds having an amide linkage, there cab be mentioned an amide compound having at its both terminals obtained hydroxyl groups. Such amide compounds can be prepared by the reaction of an aminoalcohol such as ε-caprolactone, 4-aminobutanol or the like with a lactone such as ε-caprolactone, β-propiolactone, pivalolactone or the like. For example, there can be mentioned a compound represented by the following general formula.

wherein w stands for an integer of 2 to 5 and x stands for an integer of 2,3,4 or 6.

The above-mentioned diol compounds of the formula (I) are reacted with hydroxybenzoic acid or its derivatives to obtain diphenol compounds of this invention. When said diphenol compounds are used as the component (B) in the present invention, they exhibit a surprising effect as a curing agent and can provide excellent powder paints according to this invention. The diphenol compound prepared by a diol compound represented by the formula (II) and a hydroxy-benzoic acid, namely the component (B) in which $R_3$ is a hydrocarbon radical, is especially preferred because of its ready availability, more excellent storage stability of the paint and weatherability of the resulting coatings, Above all, the component (B) in which $R_3$ is a hydrocarbon radical having 2 to 10 carbon atoms have a remarkably excellent properties, and the component (B) in which $R_3$ is polymethylene glycol having 2 to 10 carbon atoms is most preferred.

There may be adoped various methods to obtain corresponding diphenol compounds by reacting diols (I) and hydroxy-benzoic acids. As representative examples, there can be mentioned an ester-exchange reaction, an esterification reaction and the reaction between epoxy compound and hydroxycarboxylic acid.

In case the diphenol compounds as component (B) are prepared by ester-exchange reaction of the corresponding diol with an alkyl hydroxybenzoate, there may be employed methyl hydroxybenzoate or the like, as the alkyl hydroxybenzoate.

As the ester exchange reaction, the conventional method may be applied. For example, in the reaction of methyl p-hydroxybenzoate and 1,6-hexane diol, the ester-exchange reaction is conducted by employing methyl p-hydroxybenzoate, a little excess 1,6-hexane diol and a catalytic amount of dibutyltin oxide and heating at a temperature of 200° C. while produced methanol is distilled off. Then the excess hexane diol is distilled off to obtain the desired compound. As another method, there may be adopted the esterification reaction of hydroxybenzoic acid with a diol. For example, into a para-hydroxybenzoic acid are added an excess 1,6-hexane diol and an organic titanium or tin catalyst to conduct the esterification reaction, followed by a condensation reaction under reduced pressure to obtain the compound represented by the following formula

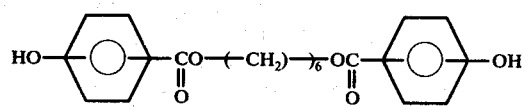

As a further method, there may be employed in 1,2-addition reaction of diepoxy compound and hydroxybenzoic acid, by which the following compounds can be prepared.

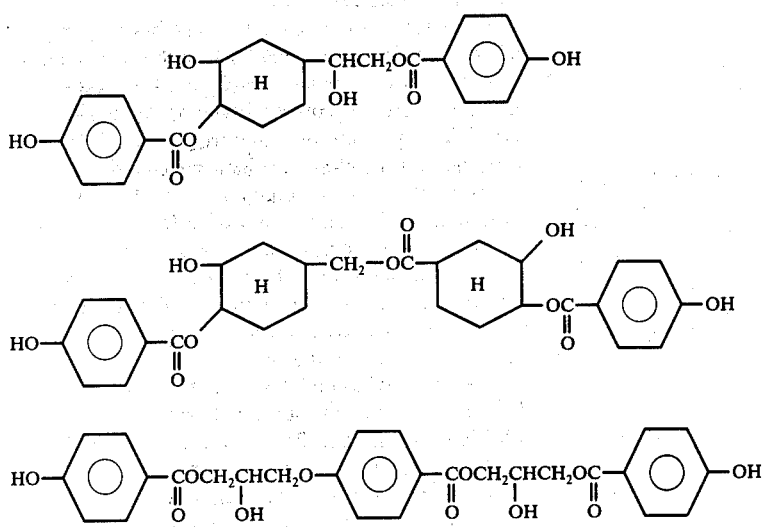

These compounds can be obtained by reacting 2 moles of hydroxybenzoic acid and 1 mole of corresponding diepoxy compound in the presence of a catalyst.

As described before, the components (B) can be employed alone or in admixture of 2 or more.

According to the present invention, there are incorporated 3 to 40 parts by weight of the component (B) as a curing agent, more preferably 10 to 40 parts by weight per 100 parts by weight of the copolymer (A). In case less than 3 parts by weight of the component (B) are used, there can not be obtained a coating sufficient in gelation density, toughness and solvent resistance. In case more than 40 parts by weight of the component (B) are used, owing to too much amount of the curing agent, there can not be obtained a coating excellent in appearance as intended in this invention.

In this invention the composition has two main components, namely, the acrylic copolymer (A) and the component (B). If desired, it is possible to use another compound as the third component in addition to the above components. The preferred compounds to be employed as the third component (C) will be described in detail later. Such component (C) is useful for enhancing the effect of this invention and may be used in such an amount that it does not retard the intended effect of this invention. It is preferable to use the compound (C) in an amount of 100 parts by weight or less per 100 parts by weight of the component (B). The component (C) is shwon as follows.

(C-1) Hydroxybenzoates having the general formula (III)

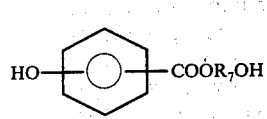

(III)

wherein $R_7$ stands for a hydrocarbon radical having 2 to 10 carbon atoms. Such hydroxybenzoated are obtained from hydroxybenzoic acid and a diol such as ethylene glycol propane diol, butane diol, pentane diol, hexane diol octane diol, decane diol, 1,4-cyclohexane dimethanol, xylylene glycol or the like.

(C-2) Compounds having at its terminals a phenol group and a carboxyl group, respectively as represented by the following general formula (IV).

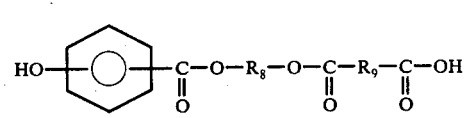

(IV)

wherein $R_8$ stands for an alkylene, polyoxyalkylene or cycloalkylene group having 2 to 10 carbon atoms and $R_9$ stands for arylene, alkylene or cycloalkylene group having 2 to 10 carbon atoms.

(C-3) Compounds having at its terminals a phenol group and a carboxyl group, respectively as represented by the following general formula (V).

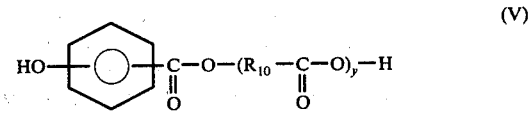

(V)

wherein $R_{10}$ stands for an alkylene group having 1 to 20 carbon atoms and $y$ is integer of at least 1.

(C-4) Dicarboxylic acids represented by the following general formula (VI).

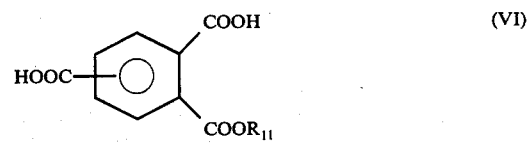

(VI)

wherein $R_{11}$ stands for an alkyl, a cycloalkyl or a polyoxyalkyl radical each having one to 10 carbon atoms such as methyl, ethyl, butyl, decyl, cyclohexyl and the like.

(C-5) Dicarboxylic acids represented by the following general formula (VII).

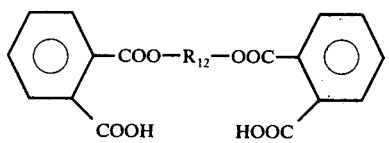

(VII)

wherein $R_{12}$ stands for a hydrocarbon radical having 2 to 10 carbon atoms such as ethylene, tri-methylene, decamethylene, 1,4-cyclohexylene, xylylene or the like.

The above-mentioned compounds employable as the component (C) may be used singly or in mixture.

The powder coating composition containing the component (C) in this invention is advantageous in the following points.

Addition of a compound selected from compounds (C-1) improves a compatibility of the copolymer (A) and the component (B) and provides an excellent appearance in the resulting coating surface.

Addition of compounds selected from compounds (C-2) and (C-3) provides an excellent appearance, especially excellent reflection sharpness in the coating surface, and further gives more excellent adhesion coating film due to its curing action to the copolymer (A).

Addition of compound selected from compounds (C-4) and (C-5) promotes a curing reaction without spoiling the physical properties of coating films, and accordingly provides the possibility of baking and curing at a relatively low temperature and for a short time.

When compounds selected from (C-2), (C-3), (C-4) and (C-5) are mixed with the component (B), and then the blend is mixed with the copolymer (A), pigments and additives, the effects as above mentioned are especially excellent.

The most preferable compound as shown in (C-1) is a p-hydroxybenzoic acid ester of a diol having 2 to 10 carbon atoms of an alkylene or a cycloalkylene radical.

Compounds of (C-2) type may be derived from a hydroxybenzoic acid, a diol and an acid anhydride corresponding to the structural units linked together through the two ester linkages in the above general formula.

As specific examples of the hydroxybenzoic acid, there can be mentioned p-hydroxybenzoic acid, m-hydroxybenzoic acid and salicylic acid. As the diol corresponding to $R_8$ there can be mentioned, for example, ethylene glycol, propylene glycol, 1,3-propane diol, 1,3-butane diol, 1,4-butane diol 1,5-pentane diol, hexamethylene diol, decamethylene diol, neopentyl glycol, hydrogenated bisphenol A, diethylene glycol, dipropylene glycol and ditetramethylene glycol. As the acid anhydride corresponding to $R_9$, there can be mentioned, for example, phthalic anhydride, succinic anhydride, maleic anhydride, himic anhydride (3,6-endo-methylene-tetrahydrophthalic anhydride), tetrahydrophthalic anhydride, hexahydrophthalic anhydride, methyltetrahydrophthalic anhydride and the like.

Compounds of the type (C-2) can be obtained by linking the foregoing structual units in successions. For example, there can be adopted a method comprising reacting hydroxybenzoic acid with an excess of a diol to effect dehydration and link both the reactants, removing the unreacted diol and adding an acid anhydride to the reaction mixture to effect a further reaction, and a method comprising reacting a mono-ester of hydroxybenzoic acid with a lower alcohol such as methanol or ethanol, with an excess of a diol to effect ester exchange, removing the unreacted diol and adding an acid anhydride to the ester-exchange reaction mixture to effect a further reaction.

Compounds of (C-3) type may be prepared by the addition reaction between hydroxybenzoic acid, preferably parahydroxybenzoic acid, and a lactone. As the lactone, there are preferably employed β-propio-lactone, β-butyrolactone, ε-caprolactone, pivalolactone, 4-methylisopropyl-ε-caprolactone and the like. Use of ε-caprolactone is especially preferred. In general, the lactone is used in an amount of at least 1 mole per mole of the hydroxybenzoic acid, and a preferred amount used of the lactone is 1 to 10 moles per mole of the hydroxybenzoic acid. It is preferred that the molecular weight of the above hydroxybenzoic acid-lactone adduct be within a range of from 210 to 1,000.

The composition of this invention may be used in the form of a clear paint, but in general, it is used after such additives as pigment, flow modifier, sagging-preventive agent, curing promotor, antistatic agent, anti-forming agent, ultraviolet absorber, anti-oxidant, fire retardant and plasticizer have been incorporated according to suitable methods. If desired, it is possible to employ the other curing agents and resins, and organic or inorganic substances as a filler and a reinforcing agent as far as the physcial properties of this invention are not degraded. Such additives as mentioned above may be those conventionally employed. For example, as the curing promotor there may be employed small amounts of amines such as diamino-diphenyl-methane, diamino-diphenyl-sulfone, dimethylaniline and 2,4,6-tri(dimethylaminomethyl) phenol; carboxylic acid salts of such amines, dicyandiamide; imidazoles and their metal salts and organic or inorganic acid salts; tertiary amine complex salt of $BF_3$; tetra-alkyl ammonium salts; amine salts of paratoluenesulfonic acid and benzenesulfonic acid and their amine salts such as morpholine salts; polycarboxylic acid polyhydrazides such as adipic acid dihydrazide and sebacic acid dihydrazide; and amine salts of super coordinated silicon compound.

It is surprising that when the known diphenol type curing agent which requires drastic baking conditions, for example, bisphenol A, 2,7-dihydroxynaphthalene, 4,4'-sulfonyldiphenol, 1,1'-bis(4-hydroxyphenyl)-cyclohexane, bis-(4-hydroxyphenyl)-methane or the like is used together with the component (B) in this invention, the curing reaction proceeds satisfactorily even in mild baking conditions. With use of such combination of curing agents as compared with the case where the curing agent of this invention alone is employed, the curing reaction is a little slow but there can be obtained a coating having well-balanced practical properties, especially the coating excellent in appearance. In addition, there is such a practical advantage that a low cost compound such as bisphenol A or the like can be used.

As the other resins, there may be employed, for example, polyesters, alkyd resins, epoxy resins, phenolic resins, amino resins and polyamides. In case a polyester resin is incorporated in the powder coating composition of this invention, there can be attained suitable effect for the object of this invention. Illustratively stated, incorporation of the mixture obtained by blending and kneading the curing agent of the component (B) and the polyester resin highly enhances the blending and kneading ability of powder paints, leading to improvements in mechanical strengths of the resulting coating and anitblocking property of the powder paints. Further, it is noted that addition of the epoxy resin in an appropriate amount preferably serves corrosion resistance to increase.

The mixing of these additives with the component (B) and the copolymer (A) is effected by a melt blending method in which all the components are kneaded in the molten state under heating and high shearing and the kneaded mixture is pulverized again. Further, there may be employed a solution mixing method. When the copolymer (A) is prepared according to the solution polymerization technique, the mixing is preferably performed by the solution mixing method. In such case, the component (B) and the additive are added to the polymer solution and mixed according to the solution mixing method, and after removal of the solvent the resulting mixture is granulated and pulverized according to customary procedures. In case the copolymer (A) is recovered as a solid, the solution obtained by dissolving the solid into a suitable solvent is mixed with the component (B) and the additives by the solution mixing method, and the resulting mixture is granulated and pulverized.

The powder coating composition of this invention may be applied to articles to be coated by the conventional coating method, for example, electrostatic spray coating method, and then baked and cured usually at 140° to 200° C. for 10 to 60 minutes in a hot air furnace to provide excellent mechanical physical properties in the resulting coatings.

The so obtained powder paints of this invention can be recovered and stored without loss even when the powder paints are applied to articles to be coated and baked under severe conditions i.e. conditions of high temperature and high humidity. Further, it should be noted that the powder coating compositions give a coating having a high corrosion resistance, excellent gloss, smoothness and mechanical strengths, and are useful for making decorative coatings on not only metal articles but also plastics and glass articles.

This invention will be described in detail by reference to the Examples. Properties mentioned in the Examples were measured and evaluated according to the following method.

1. Film Thickness:

A magnetic film thickness gauge was used, and the film thickness was determined from the difference of the magnetic force.

2. Gloss:

The film gloss was measured at an incident angle of 60° by a gloss meter by using as a standard plate a black plate (No. 74 B 150 manufactured by Suga Shikenki Kabushiki Kaisha, Japan) according to JIS-K-5400-6-7. In some examples, gloss is shown as good, which means "at least 90 %".

3. Smoothness:

The smoothness was evaluated by a naked eye observation on the following rating: especially good: no orange peels were obserbed. good: orange peels were hardly observed. fairly good; orange peels were slightly obserbed.slightly bad: orange peels were definitely observed. bad: formation of orange peels was conspicuous.

4. Reflection Sharpness:

A card board having a width of 5 cm and a length of 50 cm, on which a striped pattern of alternately arranged black and white stripes of a width of 2 mm was formed by coating, was placed horizontally, and a coated panel was erected on one end of the card board rectangularly thereto. Eyes were fixed at a position 30 cm distant horizontally from the coated panel on the card board and 30 cm distant vertically upwardly from the surface of the card board. From this point the black-white pattern reflected on the panel was seen and the highest point where the black-white pattern reflected on the panel could be definitely discriminated was determined and the distance from the panel-erected end to the above critical point was measured. The reflection sharpness determined by this method is influenced by the gloss and smoothness of the film.

5. Storage Stability:

The powder paint was allowed to stand still at 35° C. for 48 hours, and the coagulation state of the paint particles was examined with the naked eye. The storage stability was evaluated on the following rating.

especially good: no substantial coagulation of the paint particles was obserbed and a good flowability was retained at 35° C. even after the powder paint was allowed to stand at 35° C. for 1 week.

good: no substantial coagulation of the paint particles was observed and a good flowability was retained.

fairly good: coagulation of the paint particles was slightly obserbed.

bad: coagulation of the paint particles was definitely observed and re-pulverization was necessary for restoring the flowability.

6. Volatility (weight loss by volatilization):

The powder paint was allowed to stand still at 170° C. for 30 minutes in a Petri dish, and the weight loss by volatilization was determined. The smell of the volatilized gas was examined.

7. Erichsen Value:

A punch having a diameter of 20 mm was pushed out from the back side of a coated panel and the distance (mm) of the push-out distance causing cracks and peels on the coated film was measured according to JIS-Z-2247.

8. Du Pont Impact Value:

A coated panel was placed, with the coated face being positioned upside, between a weight of 500 g having a round top end of a diameter of 0.5 inch and a receiving stand having a recess of a configuration in agreement with the round top end of the weight. The weight was let to fall on the coated surface from a certain height and it was examined whether the coated surface was damaged or not. The impact strength was expressed in terms of the greatest height (cm) not causing damages on the coated surface according to JIS-K-5400-6-13-3.

9. Bending strength:

A bending tester was used. A coated panel was placed, with the coated face being positioned outside the mandrel having a diameter of 6 mm and bended at an angle of 180°. A bended part of the coated face was observed with the naked eye and cracks and peels were examined according to JIS-K-5400-6-5.

Pass: No crack nor peel

Out: Crack and peel

This invention will now be described in detail by reference to the following Examples that by no means limit the scope of this invention.

Referential Example 1

This Example illustrates the preparation of the copolymer (A).

A mixture of monomers and a polymerization initiator having the following composition:

| | |
|---|---|
| Styrene | 25 parts by weight |
| Methyl methacrylate | 37 parts by weight |
| n-Butyl acrylate | 16 parts by weight |
| Glycidyl methacrylate | 22 parts by weight |
| Azobisisobutyronitrile | 2 parts by weight | was added dropwise to 100 parts by weight of toluene at 110° C. to effect polymerization for about 2 hours. The mixture was heated at the above temperature for 4 hours, and the solvent was removed under reduced pressure to obtain a copolymer in a final yield of 95 %.

The content of glycidyl methacrylate of the copolymer was 22.3 % by weight as measured by poxy value analysis.

The weight average molecular weight of the copolymer was 17,000 and the glass transition point was 52° C. as measured by a differential scanning calorimeter (DSC).

Referential Example 2

This Example illustrates the preparation of the compound (B)

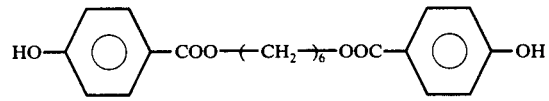

as the curing agent.

A 3 liter capacity flask equipped with a stirrer, a highly efficient distilling apparatus and a thermometer was charged with 608g of methyl p-hydroxy-benzoate, 283g of 1,6-hexanediol and 3g of dibutyltin oxide. The solution was heated at 200° C. for about 6 hours to effect reaction under a nitrogen current at a flow rate of about 60 ml./min. The produced methanol, as the reaction proceeded, only was distilled and the reaction was stopped, when an intended amount of methanol was obtained.

An excess 1,6-hexanediol was removed by distillation under high reduced pressure at the reaction temperature.

The product was a whitish solid after room temperature cooling and the crude product was recrystallized from methylethylketone to obtain 600g of

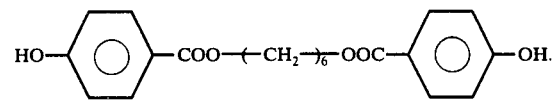

EXAMPLE 1

This Example illustrates the preparation of a powder coating composition.

The aforesaid copolymer obtained by Referential Example 1 and the following component (B):

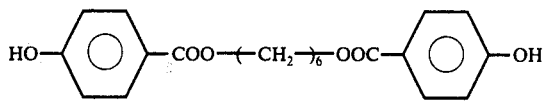

obtained by Referential Example 2 were blended by a Brabender mixer W50EC(Brabender Co.) and cooled, pulverized roughly and finely by a ball mill to obtain a powder coating composition having a particle size of 200 mesh by a standard sieve.

| | |
|---|---|
| The copolymer | 100 parts by weight |
| The component (B) | 25.2 parts by weight |
| Titanium oxide (rutile type) | 20 parts by weight |
| Modaflow (Trade Name of flow modifier manufactured by Monsanto Co., USA.) | 2 parts by weight |
| Cetyltrimethylammonium bromide | 1 parts by weight |
| Brabender blending condition | |
| Inner temperature | 100 – 110° C. |
| Blending period | 10 minutes |

The resulting compositions were spray-coated on a test panel by an electrostatic powder coater (Stajet JR 50 manufactured by Sames Co.) under coating conditions mentioned below, and the coated powder was immediately baked and cured for 30 minutes at 160° C.

| | |
|---|---|
| Coating Conditions: | |
| Test panel for bending test; | a 0.3 mm tinplate in a thickness |
| for other test; | a 0.8 mm zink phosphate-treated steel plate in a thickness |
| Electric voltage; | 60 KV |
| Electric current: | 75 μA |
| Air pressure for spraying: | 1 Kg/cm² |
| properties of the so obtained coatings were determined. | |

Comparative Example 1

For comparison, the following four curing agents were used and the coating was conducted by employing resulting comparative powder paints under the same condition as shown in Example 1 except that kinds and amounts of curing agents were used instead of component (B) as follows.

| | |
|---|---|
| Comparison 1-a | bisphenol A (16.1 parts by weight blended per 100 parts by weight of the copolymer) |
| Comparison 1-b | dihydroxy diphenyl sulfone (15.3 parts by weight blended per 100 parts by weight of the copolymer) |
| Comparison 1-c | adipic acid (13 parts by weight blended per 100 parts by weight of the copolymer) |
| Comparison 1-d | p-hydroxybenzoic acid (10 parts by weight blended per 100 parts by weight of the copolymer) |

The results obtained by Example 1 and Comparative Example 1 were shown in Table 1.

Table 1

| | | Comparison | | | |
|---|---|---|---|---|---|
| | Example 1 | 1-a | 1-b | 1-c | 1-d |
| Film thickness (μ) | 55 | 60 | 55 | 60 | 60 |
| Erichsen value (mm) | 6.0 | 1.0 | 1.0 | 5.8 | 2.1 |
| Du Pont impact value (cm) | 35 | 15 | 10 | 35 | 20 |
| Bending (6mm) | pass | out | out | Pass | out |
| Gloss (%) | 90 | 88 | 85 | 85 | 80 |
| Smoothness | good | good | fairly good | slightly bad | bad |

Table 1-continued

|  | Example 1 | Comparison | | | |
|---|---|---|---|---|---|
|  |  | 1-a | 1-b | 1-c | 1-d |
| Color | white | pale yellow | yellow | white | white |
| Volatilization weight loss (% by weight) | 0.5 | 1.2 | 1.0 | 2.0 | 1.7 |
| Smell of volatilized gas | no smell | slightly unpleasant smell | slightly unpleasant smell | unpleasant smell | slightly unpleasant smell |
| Storage stability of a powder coating composition | especially good | fairly good | fairly good | good | bad |

As apparent from Table 1, the composition obtained in the present example showed excellent mechanical properties, good appearance in coating films and well-balanced coating films as compared with the composition obtained from diphenol derivatives (Comparison 1-a and 1-b) and p-hydroxy-benzoic acid (comparison 1-d) which showed poor mechanical properties in coatings. The composition obtained from an adipic acid (Comparison 1-c) showed good mechanical properties in coating films but had an unpleasant smell at baking. It is also to be noted that the present composition has a small volatile weight loss, no unpleasant smell at baking and is excellent in air polution.

Referential Example 3

In the same manner as described in Referential Example 1, a copolymer having the following composition was prepared:

| Styrene | 35 parts by weight |
| Methyl methacrylate | 25 parts by weight |
| n-Butyl acrylate | 20 parts by weight |
| Glycidyl methacrylate | 20 parts by weight |

The content of glycidyl methacrylate was 20.2% by weight. The weight average molecular weight of the copolymer was 21,000 and the glass transition point was 45° C. as measured by a differential scanning calorimeter.

Referential Example 4

In the same manner as described in Referential Example 2 except that a diethylene glycol was used instead of 1,6-hexanediol, a compound having the following formula was prepared:

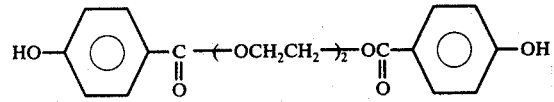

Referential Example 5

This Example illustrates the preparation of the component (B) having the following formula:

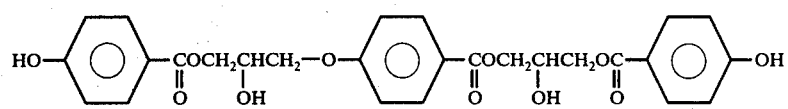

A 2 liter capacity flask equipped with a stirrer and a condenser was charged with 376 parts by weight of p-hydroxybenzoic acid, 250 parts by weight of p-hydroxybenzoic acid glycidyl ether ester, 1.5 parts by weight of dimethyl aniline and 1,000 parts by weight of methyl isobutyl ketone and the mixture was refluxed for 5 hours. Then the methylisobutylketone was removed under reduced pressure and the product was used as a component (B) without purification.

Referential Example 6

In the same manner as described in Referential Example 2 except that

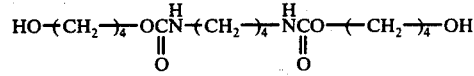

was used instead of 1,6-hexane diol, a compound having the following formula was prepared:

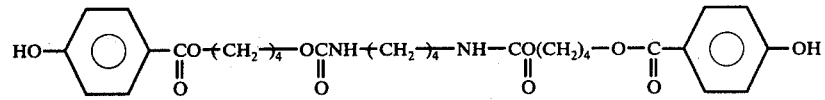

Referential Example 7

In the same manner as described in Referential Example 2 except that

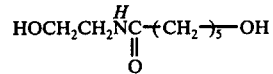

was used instead of 1,6-hexane diol, a compound having the following formula was prepared:

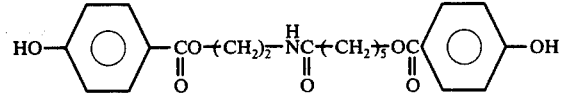

Referential Example 8

In the same manner as described in Referential Example 2 except that

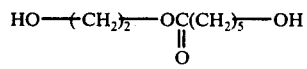

OH was used instead of 1,6-hexane diol, a compound having the following formula as the main component was prepared:

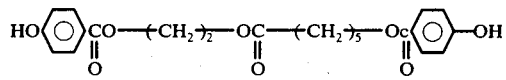

EXAMPLE 2

Powder paints were prepared in the same manner as described in Example 1 except that 100 parts by weight of the copolymer obtained in Referential Example 3, the following component (B) used as curing agents as additives 20 parts by weight of rutil type titanium oxide, 1 part by weight of cetyltrimethyl ammonium bromide, and 1 part by weight of Modaflow were previously mixed in the powder state and kneaded by a Brabender mixer, (W50EC type).

Example 2-a Component (B)

A compound obtained from Referential Example 4: 24.4 parts by weight

Example 2-b Component (B)

A compound obtained from Referential Example 5: 37 parts by weight

Example 2-c Component (B)

A compound obtained from Referential Example 6: 32.4 parts by weight

Example 2-d Component (B)

A compound obtained from Referential Example 7: 29.3 parts by weight

Example 2-e Component (B)

A compound obtained from Referential Example 8: 29.3 parts by weight

Comparative Example 2

As a comparative example of Example 2, the following curing agents were used and the coating was conducted by employing resulting comparative powder paints as described in Example 2 except that the following kinds and amounts of curing agents were used instead of component (B).

| Comparison 2-a | bisphenol A (16.1 parts by weight blended per 100 parts by weight of the copolymer) |
| --- | --- |
| Comparison 2-b | 4,4-diphenol (13 parts by weight blended per 100 parts by weight of the copolymer) |

The obtained results of Example 2 and Comparative Example 2 are shown in Table 2.

Table 2

| | Example | | | | | Comparison | |
| --- | --- | --- | --- | --- | --- | --- | --- |
| | 2-a | 2-b | 2-c | 2-d | 2-e | 2-a | 2-b |
| Film thickness ($\mu$) | 60 | 60 | 60 | 60 | 60 | 60 | 60 |
| Erichsen value (push-out distance, mm) | 6 | 6.5 | 6.3 | 5.5 | 6.5 | 1 | 1 |
| Du Pont impact value (cm) | 35 | 40 | 40 | 35 | 40 | 1.5 | 1.5 |
| Bending (6mm$\phi$) | pass | pass | pass | pass | pass | out | out |
| Gloss (%) | good | good | good | good | good | good | good |
| Smoothness | good | good | good | good | good | good | good |
| Storage stability of a powder coating composition | good | good | good | good | good | bad | fairly good |

The coatings obtained in the present example showed excellent mechanical properties in all cases as compared with those in the comparisons.

In order to study curing properties the above-mentioned four powder coating compositions (Example 2-a, 2-b, and Comparison 2-a, 2-b), were cured by heating at 155° C. for varied periods of time, and solubilities of the obtained coatings in ethyl cellosolve were examined. As a result, it has been found that the following periods of time are required for gelling the coating compositions.

| Example | (2-a) | about 2 minutes |
| --- | --- | --- |
| | (2-b) | " |
| Comparison | (2-a) | about 4 minutes |
| | (2-b) | " |

It should be noted that the present compositions have higher reactivities as compared with Comparisons obtained from curing agents of diphenol type, and as a result it is possible to bake and cure powder paints at a lower temperature, and easily to obtain excellent properties in coatings.

Referential Example 9

In the same manner as described in Referential Example 1, copolymers having the following results as shown in Table 3 were prepared:

Table 3

| Acrylic copolymer | | A | B | C | D | E |
| --- | --- | --- | --- | --- | --- | --- |
| | parts by weight | | | | | |
| Styrene | " | 65 | 35 | 35 | 20 | 30 |
| Methyl methacrylate | " | | 25 | 30 | 25 | |
| n-Butyl acrylate | " | 15 | 18 | | | |
| n-Butyl methacrylate | " | | | | 35 | 40 |
| 2-Ethylhexyl acrylate | " | | | 20 | | |
| 2-Hydroxyethyl acrylate | " | | | | | 10 |
| Glycidyl methacrylate | " | 20 | 22 | 15 | 20 | 20 |
| Azobisisobutyronitrile | " | 2.0 | 3.0 | 1.5 | 2.0 | 1.5 |
| The weight average molecular weight of the copolymer | | 16,000 | 12,000 | 22,000 | 17,000 | 22,000 |
| The glass transition | | 54 | 48 | 50 | 59 | 49 |

EXAMPLE 3

In the same manner as described in Example 1 except that the copolymer obtained from Referential Example 9,

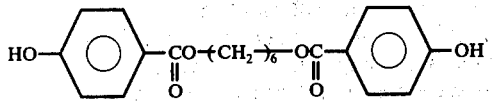

as a component (B) and additives as shown in Table 4 were blended coated, baked and cured. Film characteristics of the obtained compositions were evaluated and the results were shown in Table 5. As apparent from Table 5, the obtained compositions showed excellent mechanical properties in coating films in spite of change in composition of acrylic copolymers and in blend ratio.

Table 4

| | Example | | | | |
|---|---|---|---|---|---|
| | 3-a | 3-b | 3-c | 3-d | 3-e |
| Acrylic copolymer | A | B | C | D | E |
| Amount of curing agent | 22.6 | 21.2 | 17.0 | 19.0 | 22.6 |
| Titanium oxide (rutile type) | 20 | 20 | 20 | 20 | 20 |
| Modaflow (Trade Name of modifier manufactured by Monsanto Co., USA.) | 0.4[1] | 0.3[1] | 0.3[1] | 0.5[2] | 0.3[2] |
| Cetyltrimethyl ammonium bromide | 0 | 1.0 | 0.5 | 1.0 | 0 |

Note:
The value in the Table shows parts by weight blended per 100 parts by weight of copolymer
[1] Silicone oil L-050 (Trade Name of flow modifier manufactured by Hochst Co.)
[2] Dimethyl polysiloxane (Mn=900)

Table 5

| | 3-a | 3-b | 3-c | 3-d | 3-e |
|---|---|---|---|---|---|
| Film thickness ($\mu$) | 60 | 60 | 60 | 60 | 60 |
| Erichsen value (mm) | 6.9 | 6.0 | 5.0 | 6.1 | 5.5 |
| Du Pont impact value (cm) | 35 | 30 | 35 | 35 | 30 |
| Bending (6mm$\phi$) | pass | pass | pass | pass | pass |
| Gloss (%) | good | good | good | good | good |
| Smoothness | good | good | good | good | good |

Referential Example 10

In the same manner as described in Referential Example 1, a copolymer having the following composition was prepared:

| Styrene | 5 parts by weight |
|---|---|
| Methyl methacrylate | 45 parts by weight |
| Butyl methacrylate | 30 parts by weight |
| Glycidyl methacrylate | 20 parts by weight |

The resulting copolymer was found to have a glass transition point of 63° C. accoding to DSC and a weight average molecular weight of 15,000. The content of glycidyl methacrylate of copolymer was 20.1% by weight.

Referential Example 11

A compound having the following formula

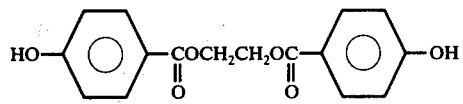

was prepared in the same manner as described in Referential Example 2 except that a methyl p-hydroxybenzoate and an ethylene glycol were used, and said compound was used as a component (B) without purification.

Referential Example 12

This Example illustrates the preparation of the compound (C) represented by the following formula

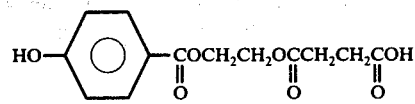

A 3 liter capacity flask equipped with a stirrer, highly efficient distilling apparatus and a thermometer was charged with 456g of methyl p-hydroxybenzoate, 744g of ethylene glycol and 1.5g of dibutyltin oxide. The reaction was effected in a nitrogen current of about 60 ml/min. at a temperature of about 200° C. The methanol obtained as the reaction proceeded, was distilled and the reaction was stopped when an intended amount of methanol was obtained. An excess ethylene glycol was removed under reduced pressure at about 150° C. Then, 330g of a succinic anhydride was added to effect the reaction at about 150° C. for 3 hours. Recrystallization of this crude product from a mixed solvent of methylethylketone and toluene gave desired crystals having a melting point of 122° C.

Referential Example 13

A compound having the following formula

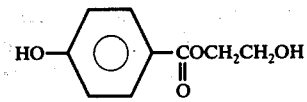

was prepared in the same manner as described in Referential Example 12 except that the reaction mixture before a succinic anhydride was added, was recrystallized from the mixed solvent of methylethylketone and toluene. The so obtained compound was found to have a melting point of 140° C.

Referential Example 14

A 1 liter capacity flask equipped with a stirrer, highly efficient distilling apparatus and a thermometer was charged with 221g of p-hydroxybenzoic acid, 62g of ethylene glycol and 0.1g of tin oxalate to effect an esterification reaction at 200° C. in a nitrogen current of about 60 ml/min. The esterification reaction was stopped when an intended amount of water was distilled. Then, 41g of succinic anhydride were added and reacted with the reaction mixture at 150° C. for 3 hours. The obtained product was a composition containing about 60 parts by weight of compound represented by the following formula

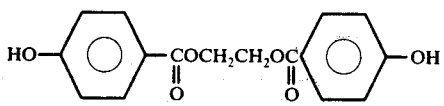

and about 40 parts by weight of compound represented by the following formula

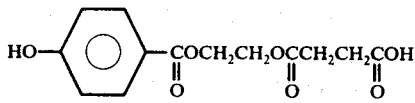

Referential Example 15

This Example illustrates the preparation of the compound (C) represented by the following formula as the main component

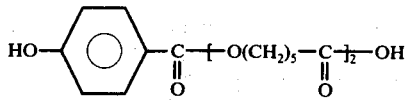

1 mole of p-hydroxybenzoic acid was mixed with 2 moles of ε-caprolactone at 150° to 160° C. in a nitrogen current in a separable flask to form a solution. Then, the temperature of the solution was elevated to 180° C. and the solution was heated at this temperature for 5 hours to effect reaction. A minute amount of the unreacted ε-caprolactone was removed under reduced pressure to obtain an intended white compound.

Example 4

Powder paints were prepared in the same manner as described in Example 1 except that 100 parts by weight of the polymer obtained in Referential Example 10, the following compound used as the component (B) and component (C), 20 parts by weight of rutil type titanium oxide, 1 part by weight of cetyltrimethylammonium bromide, and 1 part by weight of Modaflow were previously mixed in the powder state and melt-kneaded by a Brabender mixer (W50EC type).

Example 4-a

A compound obtained from Referential Example 11: 21.3 parts by weight

Example 4-b

A compound obtained from Referential Example 11: 12.8 parts by weight and A compound obtained from Referential Example 12: 7.9 parts by weight Example 4-c A compound obtained from Referential Example 14: 20.7 parts by weight Example 4-d A compound obtained from Referential Example 11: 12.8 parts by weight and A compound obtained from Referential Example 15: 10.3 parts by weight Example 4-e A compound obtained from Referential Example 11: 20.0 parts by weight and A compound obtained from Referential Example 13: 3.0 parts by weight Comparative Example 4

For comparison of Example 4, 13 parts by weight of adipic acid was used as curing agent instead of component (B) and component (C). The so obtained powder paints were coated and baked in the same manner as in Example 4.

The obtained results of Example 4 and Comparative Example 4 are shown in Table 6.

Table 6

| | Example | | | | | Comparison |
|---|---|---|---|---|---|---|
| | 4-a | 4-b | 4-c | 4-d | 4-3 | 4 |
| Film thickness (μ) | 60 | 60 | 60 | 60 | 60 | 60 |
| Bending (6mmφ) | pass | pass | pass | pass | pass | pass |
| Gloss (%) | 90 | 94 | 92 | 92 | 95 | 83 |
| Smoothness | good | good | good | good | especially good | bad |
| Reflection sharpness (cm) | 23.0 | 27.8 | 26.3 | 25.8 | 29.8 | 18.3 |

As apparent from Table 6, the Example of this invention provided coatings excellent in appearance and suitable for decoration, and especially the coatings obtained in Example 4-b to 4-e were satisfactorily excellent in appearance.

Referential Example 17

This Example illustrates the preparation of the compound (B) as a curing agent.

A compound having the following formula

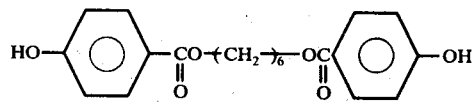

was prepared by an esterification of p-hydroxybenzoic acid and 1,6-hexane diol. A 1 liter capacity flask equipped with a stirrer, highly efficient distilling apparatus and a thermometer was charged with 276g of p-hydroxybenzoic acid, 236g of 1,6-hexanediol and 0.5g of dibutyltin oxide to effect the esterification reaction at 200° C. in a nitrogen current of 60 ml/min. When an intended amount of water was removed, condensation reaction was conducted under a reduced pressure at 220° C. for 5 hours. The obtained crude product was a composition containing as a main component a compound represented by the following formula

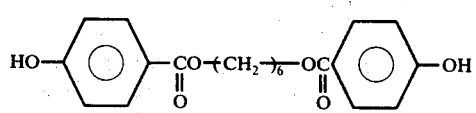

and about 5% by weight of a compound represented by the following formula

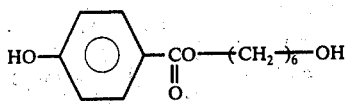

Referential Example 18

A trimellitic acid monobutyl ester was prepared from a trimellitic anhydride and a butanol.

Referential Example 19

A dicarboxylic acid was prepared from 2 moles of phthalic anhydride and 1 mole of 1,4-butane diol.

EXAMPLE 5

Powder paints were prepared in the same manner as described in Example 1 except that 100 parts by weight of the copolymer obtained in Referential Example 1, the following compound used as the component (B) and component (C) 20 parts by weight of rutil type titanium oxide, 1 part by weight of cetyltrimethylammonium bromide, and 1 part by weight of Modaflow were previously mixed in the powder state and melt-kneaded by a Brabender mixer (W50EC type).

Example 5-a

A composition obtained from Referential Example 17: 25.2 parts by weight

Example 5-b

A composition obtained from Referential Example 17: 20 parts by weight and A compound obtained from Referential Example 18; 3 parts by weight

Example 5-c

A composition obtained from Referential Example 17: 17.6 parts by weight and A compound obtained from Referential Example 18: 6 parts by weight

Example 5-d

A composition obtained from Referential Example 17: 15.1 parts by weight and Bisphenol A: 6.4 parts by weight The obtained powder paints were coated and baked in the same manner as in Example 1 and the properties of the resulting coatings were tested to obtain results shown in Table 7.

Table 7

| | 5-a | 5-b* | 5-c* | 5-d |
|---|---|---|---|---|
| Film thickness ($\mu$) | 60 | 60 | 60 | 60 |
| Bending (6mm$\phi$) | pass | pass | pass | pass |
| Gloss (%) | 90 | 92 | 91 | 93 |
| Smoothness | good | good | good | good |
| Reflection sharpness (cm) | 22.0 | 25.5 | 26.3 | 25.8 |
| Storage stability | especially good | especially good | good | good |

*baked at 150° C. for 30 minutes

The obtained coatings were excellent in the mechanical properties and appearance and the powder paints had a good storage stability. Especially, Examples 5-b and 5-c in which the powder paints were baked at a low temperature such as 150° C. provided a remarkable effect when the component (C) was added thereto. The Example 5-d employing a bisphenol A with the curing agents of this invention provided coatings improved in the strength over the coating prepared from Comparative Example 1-a and the powder paints were excellent in storage stability.

Referential Example 20

A mixture of monomers, a polymerization initiator and a chain transfer reagent having the following composition:

| | |
|---|---|
| Vinyltoluene | 25 parts by weight |
| α-Methylstyrene | 5 parts by weight |
| β-Methylglycidyl methacrylte | 15 parts by weight |
| Glycidyl methacrylate | 10 parts by weight |
| Ethyl methacrylate | 25 parts by weight |
| Isobuthyl methacrylate | 20 parts by weight |
| Benzoyl peroxide | 8 parts by weight |
| t-Dodecyl mercaptane | 2 parts by weight | was added dropwise for 2.5 hours to 150 parts by weight of xylene at 130° C. to effect polymerization, and was heated additionally at the above temperature for 2 hours. Then the solvent was removed under reduced pressure to obtain a copolymer (A).

The weight average molecular weight of the copolymer was 6,000 and the glass transition point was 74° C. as measured by a differential scanning calorimeter.

Referential Example 21

In the same manner as described in Referential Example 1, a copolymer (A) having the following composition was prepared:

| | |
|---|---|
| Ethyl acrylate | 18 parts by weight |
| 2-Ethylhexyl acrylate | 23 parts by weight |
| Glycidyl acrylate | 5 parts by weight |
| Glycidyl methacrylate | .5 parts by weight |
| Acrylonitrile | 14 parts by weight |
| β-Methylstyrene | 10 parts by weight |
| Styrene | 25 parts by weight |
| Lauroyl peroxide | 3.5 parts by weight |

The so obtained copolymer was found to have a glass transition point of 40° C. and a weight average molecular weight of 25,000.

Referential Example 22

In the same manner as described in Referential Example 1, a copolymer (A) having the following composition was prepared:

| | |
|---|---|
| Styrene | 25 parts by weight |
| Glycidyl acrylate | 7 parts by weight |
| Methyl acrylate | 35 parts by weight |
| n-Butyl acrylate | 30 parts by weight |
| 2-Hydroxyethyl acrylate | 3 parts by weight |
| Azobisisobutyronitrile | 0.9 parts by weight |

The so obtained copolymer was found to have a glass transition point of 51° C. and a weight average molecular weight of 28,000.

Referential Example 23

This Example illustrates the preparation of the component (B) of this invention. The same apparatus as described in Referential Example 2 was charged with 608 parts by weight of methyl salicylate, 87 parts by weight of 1,10-decane diol and 5 parts by weight of tin oxalate to effect an esterification reaction at 200° C. in a nitrogen current of about 60 ml/min. The esterification reaction was continued for about four hours, and stopped when an intended amount of produced methanol was distilled. Then excess methyl salicylate was removed under reduced pressure and the waxy product was obtained after room temperature cooling, the main component of which was found to have the following formula by analyses of Liquid Chromatography, NMR spectrum and IR spectrum.

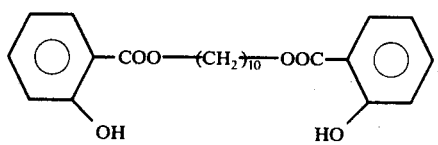

Referrential Example 24

In the same manner as described in Referential Example 23, the waxy solid, the main product of which had the following formula, was obtained from an equimolar mixture of methyl p-hydroxybenzoate and methyl m-hydroxybenzoate, and the oligomer of butane diol having an average polymerization degree of 5, and hydroxyl groups in both ends of the oligomer molecule.

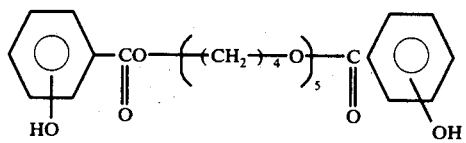

wherein a hydroxyl group is substituted in the position of para or meta of a benzene nucleus.

EXAMPLE 6

Powder coating compositions, having compositions as shown in Table 8, were prepared, coated, baked and cured at 160° C for 30 minutes. The results were shown in Table 9.

The results show that the present compositions had excellent storage stabilities, good mechanical properties and excellent appearance in coatings.

Table 8

| Example | 6-a | 6-b | 6-c | 6-d |
|---|---|---|---|---|
| Copolymer (A) | Referential Example 20 | Referential Example 21 | Referential Example 22 | Referential Example 1 |
| Amount of Copolymer (A) | 100 | 100 | 100 | 100 |
| Component (B) | Referential Example 23 | Referential Example 11 | Referential Example 11 | Referential Example 24 |
| Amount of Component (B) | 29 | 10 | 6 | 40 |
| Amount of titanium oxide | 20 | 20 | 20 | 20 |
| Amount of Modaflow | 2 | 1 | 2 | 1 |
| Amount of cetyltrimethyl ammonium bromide | 2 | 1 | 1 | 1 |

(amount of each component mentioned above is shown by parts by weight)

Table 9

| | Example | | | |
|---|---|---|---|---|
| | 6-a | 6-b | 6-c | 6-d |
| Film thickness (μ) | 55 | 60 | 55 | 60 |
| Erichsen value (mm) | 5.3 | 6.8 | 6.0 | 7.0 |
| Color | white | white | white | white |
| Smoothness | good | good | good | good |
| Gloss (%) | 95 | 93 | 93 | 94 |

Table 9-continued

| | Example | | | |
|---|---|---|---|---|
| | 6-a | 6-b | 6-c | 6-d |
| Storage stability | good | especially good | especially good | good |

What is claimed is:

1. A powder coating composition comprising (A) 100 parts by weight of an epoxy group-containing copolymer of
    1. from 3 to 35% by weight, based on said copolymer, of a monomer represented by the following general formula

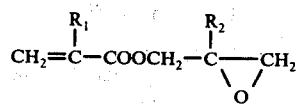

wherein $R_1$ and $R_2$ stand for a hydrogen atom or a methyl group, and
    2. from 97 to 65% by weight of an ethylenically unsaturated monomer selected from the group consisting of acrylic acid esters, methacrylic acid esters, acrylonitrile, methacrylonitrile, styrene, vinyltoluene and α-methylstyrene, said copolymer having a glass transition point of 30° to 90° C, and (B) 3 to 40 parts by weight of at least one of compounds represented by the general formula

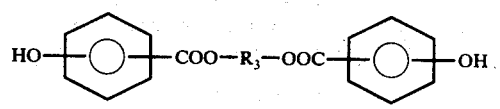

wherein $R_3$ stands for a hydrocarbon radical having 2 to 20 carbon atoms or a linking group containing, at least at its both terminals, hydrocarbon radicals and in its main chain at least one member selected from the group consisting of an ether linkage, ester linkage, urethane linkage and amide linkage, and having totally 4 to 20 carbon atoms.

2. A powder coating composition according to claim 1 wherein in said compound (B), $R_3$ is a hydrocarbon radical having 2 to 10 carbon atoms.

3. A powder coating composition according to claim 1 wherein the compound (B) is employed in an amount of 10 to 40 parts by weight.

4. A powder coating composition according to claim 1 wherein said compound (B) has at its both terminals p-hydroxybenzoic acid ester structures.

5. A powder coating composition according to claim 1 which further comprises a compound represented by the formula

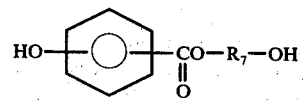

wherein $R_7$ stands for a hydrocarbon radical having 2 to 20 carbon atoms.

6. A powder coating composition according to claim 1 which further comprises a compound represented by the general formula

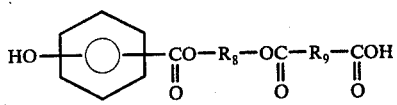

wherein $R_8$ stands for an alkylene, polyoxyalkylene or cycloalkylene group having 2 to 10 carbon atoms and $R_9$ stands for an arylene, alkylene or cycloalkylene group having 2 to 20 carbon atoms.

7. A powder coating composition according to claim 1 which further comprises a compound represented by the general formula

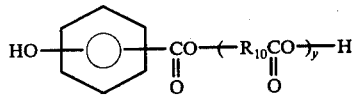

wherein $R_{10}$ stands for an alkylene having 1 to 20 carbon atoms and y stands for an integer of at least 1.

8. A powder coating composition according to claim 1 which further comprises a compound represented by the general formula

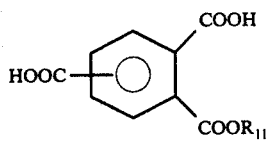

wherein $R_{11}$ stands for an alkyl, cycloalkyl or polyoxyalkyl group having 1 to 10 carbon atoms.

9. A powder coating composition according to claim 1 which further comprises a compound represented by the general formula

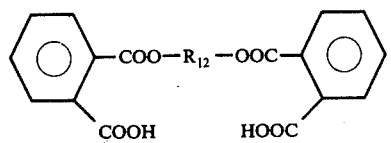

wherein $R_{12}$ stands for a hydrocarbon radical having 2 to 10 carbon atoms.

10. A powder coating composition according to claim 1 wherein said copolymer (A) has a glass transition point of 40° to 75° C and comprises 10 to 25 parts by weight of a glycidyl methacrylate monomer and 90 to 75 parts by weight of an ethylenically unsaturated monomer selected from the group consisting of acrylic acid esters, methacrylic acid esters, acrylonitrile, methacrylonitrile, styrene, vinyltoluene and α-methylstyrene.

* * * * *